United States Patent
Wang et al.

[11] Patent Number: 6,155,553
[45] Date of Patent: Dec. 5, 2000

[54] AUXILIARY STEERING DEVICE FOR A SKATEBOARD

[76] Inventors: Leao Wang; Peter Wu, both of No 1, Lane 233, Sec. 2, Charng Long Rd., Taiping 411, Taiwan

[21] Appl. No.: 09/517,085

[22] Filed: Mar. 2, 2000

[51] Int. Cl.$^7$ ........................................ B62M 1/00
[52] U.S. Cl. ................................ 270/87.041; 280/87.042; 280/11.28
[58] Field of Search ................. 280/87.041, 87.042, 280/87.043, 87.021, 11.27, 11.28, 62

[56] References Cited

U.S. PATENT DOCUMENTS

| | | | |
|---|---|---|---|
| 1,279,966 | 9/1918 | Baker | 280/87.042 |
| 2,027,254 | 1/1936 | Vogt | 280/87.042 |
| 4,061,351 | 12/1977 | Bangle | 280/87.042 |
| 4,123,079 | 10/1978 | Biskyp | 280/87.042 |
| 4,342,466 | 8/1982 | Morgan | 280/87.042 |

FOREIGN PATENT DOCUMENTS 610604  10/1948  United Kingdom ............. 280/87.042

*Primary Examiner*—Richard M. Camby

[57] ABSTRACT

The present invention is related to an auxiliary steering device for a skateboard comprising a front supporting bar, a front wheel assembly, a main shaft, a deck and two rear wheels, wherein the steering device is characterized by the main shaft having two extension bars at the end thereof, each the extension bars having a soft packing ring and a bearing; thereafter, a rear wheel being respectively pivoted on each the extension bars and wherein, when the user controls the direction by means of a handle of the front supporting bar and exerts pressure upon one side of the deck, the two extension bars of the main shaft will squeeze the soft packing ring to be in a side-sloping shape, and this will cause a loading difference between two rear wheels; accordingly, an auxiliary steering function is created and the radius of gyration of the skateboard can be reduced.

1 Claim, 4 Drawing Sheets

AUXILIARY STEERING DEVICE FOR A SKATEBOARD

BACKGROUND OF THE INVENTION

1. Field of the Invention

The present invention relates to an auxiliary steering device for a skateboard, and more particularly to a device with a smaller radius of gyration and with entertaining effect in using.

2. Description of the Prior Art

A prior art skateboard, as shown in FIG. 5, includes a front supporting bar 11 with a handle 10, a front wheel assembly 12, a rear wheel assembly 13 and a deck 14. The handle 10 and the front supporting bar 11 can control the front wheel assembly 12 for a direction-turning motion while the rear wheel assembly 13 belongs to a fixed type. Consequently, a greater radius of gyration will be produced in turning direction because no auxiliary steering device is mounted on the rear wheel assembly 13. And this will cause a reduction of speed in motion. Even the user has to repeat the direction-turning action to complete a 360° gyration motion. Thus, the potential inconvenience reduces the fun in using.

SUMMARY OF THE INVENTION

It is a main object of the present invention to provide an auxiliary steering device for a skateboard which makes use of the action of a soft packing ring to enable a main shaft to create a side-sloping effect with the sloping action of the user's body by means of a skillful operation on the main shaft; therefore, the rear wheels are caused to produce a direction-turning function so that the radius of gyration is greatly reduced.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
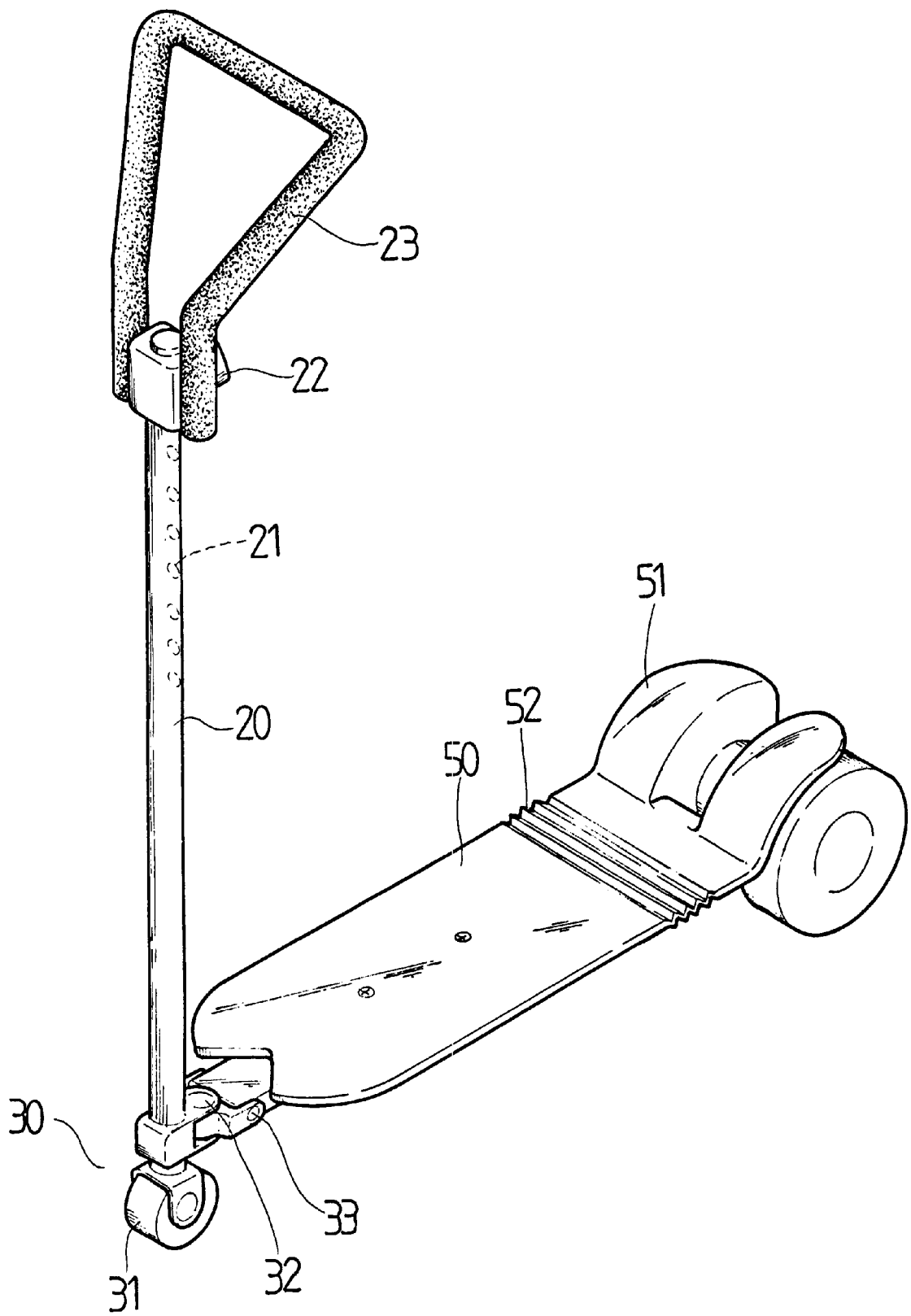
FIG. 1 is a perspective assembly view of the present invention.
Figure 2:
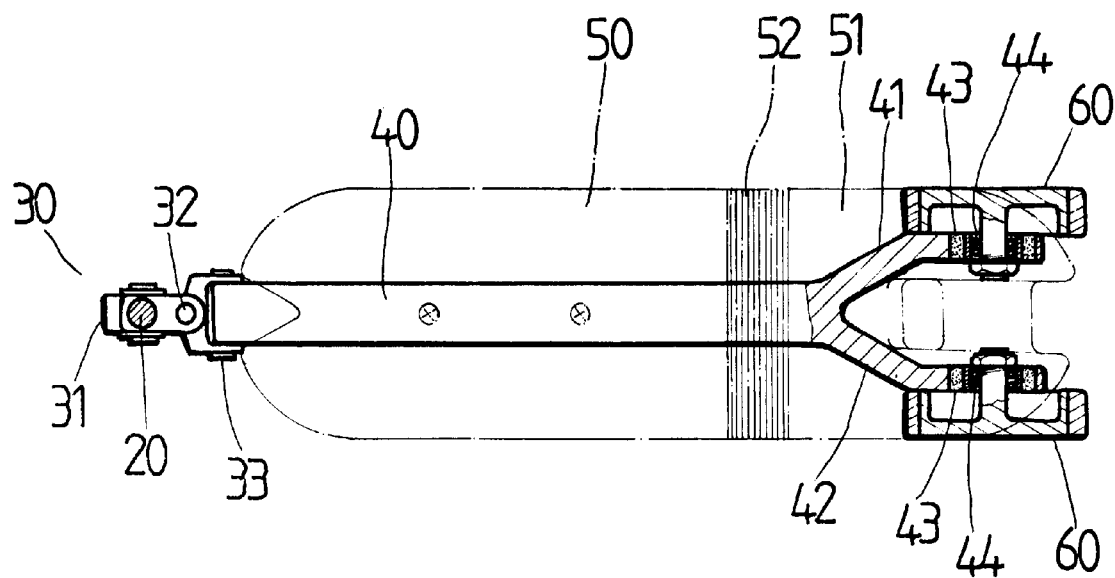
FIG. 2 is a partial cutaway top view of the present invention.
Figure 3:
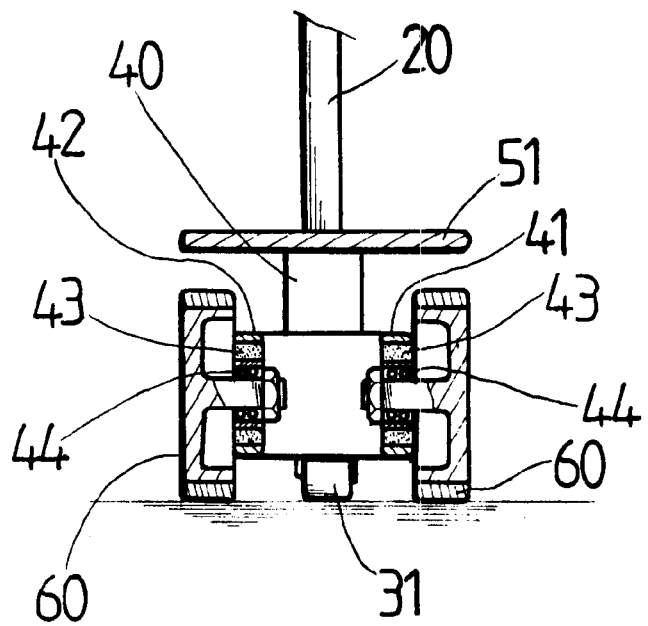
FIG. 3 is a partial cutaway rear view of the present invention.

First of all, referring to FIGS. 1, 2 and 3, the auxiliary steering device for a skateboard in accordance with the present invention which includes the following basic components:

a front supporting bar 20 having a plurality of through holes 21 for fastening a handle 23 and adjusting the height thereof in cooperation with a knob 22, a front wheel assembly 30 being coupled at the bottom end thereof;

a front wheel assembly 30 having a front wheel 31, a first pivot 32 and a second pivot 33, said second pivot 33 and a main shaft 40 being hinged together;

a main shaft 40 having two extension bars 41, 42 at the end thereof, each said extension bars 41, 42 having a soft packing ring 43 and a bearing 44; thereafter, a rear wheel 60 being respectively pivoted on each said extension bars 41,42 a deck 50 placed upon said main shaft 40, the tail 51 thereof being essentially raised and covering the top of said rear wheels 60, a proper clearance being kept between said tail 42 and said rear wheels 60, a resilient section 52 being disposed at a certain position of said deck 50 near said rear wheels 60; and two rear wheels 60 pivoted on said extension bars 41, 42 of said main shaft 40.

Figure 4:
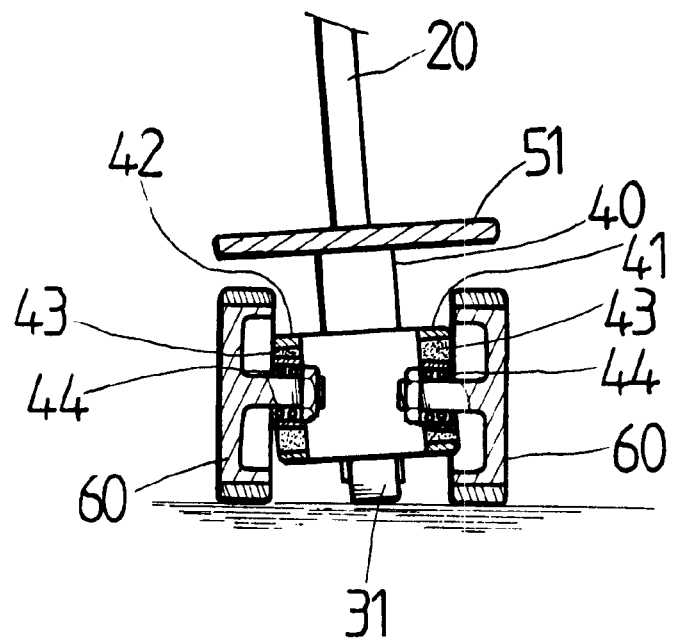
FIG. 4 is a schematic action drawing of FIG. 3.
Figure 5:
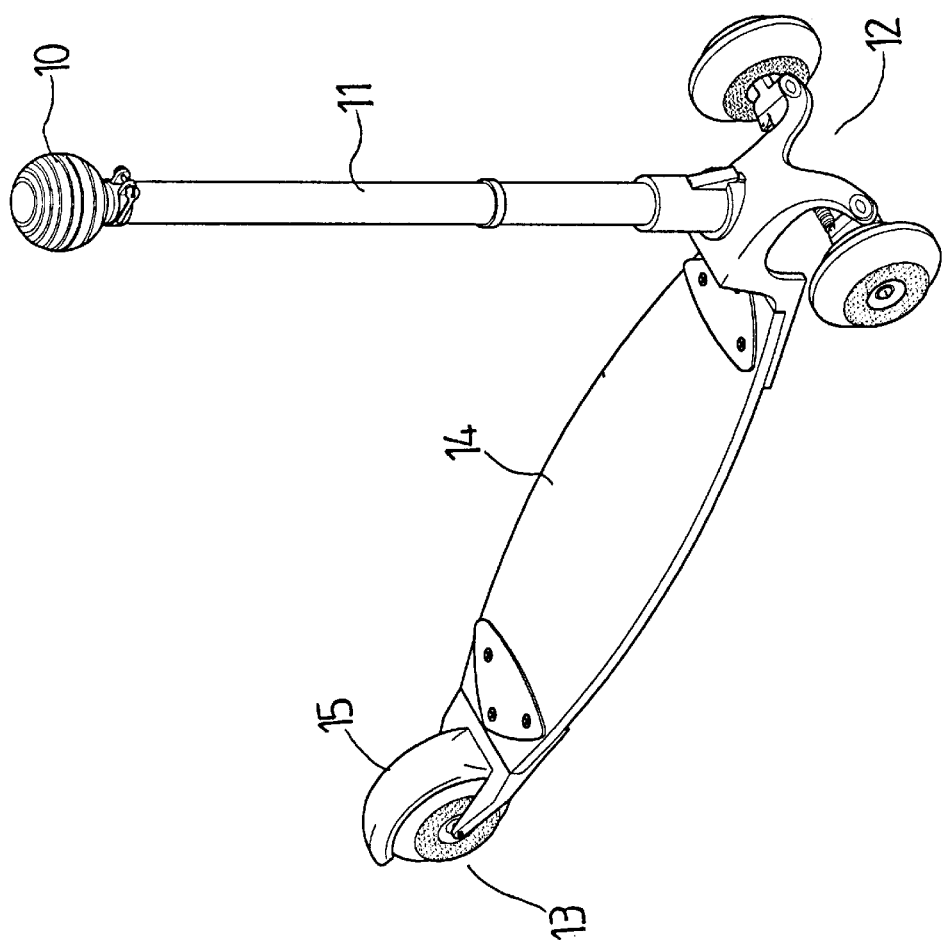
FIG. 5 is a perspective assembly view of a conventional skateboard.

After assembly of the foregoing components, as shown in FIG. 4, when the user controls the direction by means of the handle 23 and exerts pressure upon one side of the deck 50, the two extension bars 41, 42 of the main shaft 40 will squeeze the soft packing ring 43 to be in a side-sloping shape. This will cause a loading difference between two rear wheels 60. Accordingly, an auxiliary steering function is created and the radius of gyration of the skateboard can be reduced.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claim.

What is claimed is:

1. An auxiliary steering device for a skateboard comprising a front supporting bar, a front wheel assembly, a main shaft, a deck and two rear wheels, wherein said steering device is characterized by said main shaft having two extension bars at the end thereof, each said extension bars having a soft packing ring and a bearing; thereafter, a rear wheel being respectively pivoted on each said extension bars; and wherein, when the user controls the direction by means of a handle of said front supporting bar and exerts pressure upon one side of said deck, said two extension bars of said main shaft will squeeze said soft packing ring to be in a side-sloping shape, and this will cause a loading difference between two said rear wheels; accordingly an auxiliary steering function is created.

* * * * *